United States Patent [19]
Bilas et al.

[11] Patent Number: 5,315,499
[45] Date of Patent: May 24, 1994

[54] COMPUTER-CONTROLLED CIRCUIT BREAKER ENERGY MANAGEMENT ARRANGEMENT HAVING RELIABLE MEMORY AND CLOCK

[75] Inventors: Ron J. Bilas; Drew A. Reid, both of Cedar Rapids; Martin J. Wittrock, Belle Plaine, all of Iowa

[73] Assignee: Square D Company, Palatine, Ill.

[21] Appl. No.: 901,058

[22] Filed: Jun. 19, 1992

Related U.S. Application Data

[63] Continuation-in-part of Ser. No. 723,370, Jun. 28, 1991, Pat. No. 5,231,565.

[51] Int. Cl.⁵ .......................... G06F 15/56; G05B 9/02
[52] U.S. Cl. ..................................... 364/140; 364/184; 364/483; 364/492
[58] Field of Search ............... 364/140, 141, 146, 188, 364/189, 481, 483, 492–495, 184–187, 145; 361/57, 71, 97, 98, 101, 88–93; 307/34, 35, 38–41, 132 E, 115

[56] References Cited

U.S. PATENT DOCUMENTS

| 4,213,182 | 7/1980 | Eichelberger et al. | 364/145 X |
| 4,217,646 | 8/1980 | Caltagirone et al. | 364/145 X |
| 4,293,915 | 10/1981 | Carpenter et al. | 364/145 X |
| 4,466,074 | 8/1984 | Jindrick et al. | 364/145 X |
| 4,467,260 | 8/1984 | Mallick, Jr. et al. | 364/184 X |
| 4,467,434 | 8/1984 | Hurley et al. | 364/483 |
| 4,701,858 | 10/1987 | Stokes et al. | 364/483 |
| 4,964,058 | 10/1990 | Brown, Jr. | 364/481 X |
| 4,978,911 | 12/1990 | Perry et al. | 364/493 X |

Primary Examiner—Joseph Ruggiero
Attorney, Agent, or Firm—Larry I. Golden; Kareem M. Irfan

[57] ABSTRACT

An energy management loadpanel arrangement includes a load panel enclosure having a plurality of circuit breakers, each of which opens and closes in response to a control signal so as to interrupt an associated current path. A microcomputer generates the control signals to control the position of the circuit breakers and their associated current paths, and a volatile memory circuit, for example, RAM, stores time-event data which is used to indicate when the control signals should be generated. A charged electronic double-layered capacitor is coupled to the volatile memory so that, in the event of a power outage, operating power is provided to the volatile memory for extended periods of time. In this manner, the time-event data is retained during the power outage so that the circuit breakers are timely controlled, despite the power outage, in response to said control signals. A real time clock circuit is used to track the time, and the charged electronic double-layered capacitor is coupled to the real time clock circuit so that it also continues to operate during a power outage. The microcomputer is then used to periodically store an image of the current time, from the real time clock, in RAM during normal operation, so that after a power outage and when the microcomputer 120 recovers therefrom, the current value of the real time clock can be compared against this value stored in RAM and the microcomputer's duration timers can be corrected.

19 Claims, 4 Drawing Sheets

COMPUTER-CONTROLLED CIRCUIT BREAKER ENERGY MANAGEMENT ARRANGEMENT HAVING RELIABLE MEMORY AND CLOCK

RELATED APPLICATION

This is a continuation-in-part of U.S. patent application Ser. No. 07/723,370, filed on Jun. 28, 1991 and entitled ELECTRICAL DISTRIBUTION SYSTEM HAVING MAPPABLE CONTROL INPUTS, incorporated herein by reference.

FIELD OF THE INVENTION

The present invention relates generally to circuit breaker tripping arrangements, and, more particularly, to microcomputer-based circuit breaker energy management units in which the circuit breakers open and close in response to a control signal from a computer.

BACKGROUND OF THE INVENTION

Circuit breaker energy management systems are designed to control circuit breakers in a circuit breaker panelboard by commanding the circuit breakers to turn "on" and "off," so as to "close" and "open" the current path for efficient energy use. It is advantageous for such systems to be user-programmable in order to control the circuit breakers automatically at predesignated times of the day. This attribute cannot be accurately or reliably provided, however, without a reprogramming circuit which corrects the time after a power interruption.

Previously known energy management arrangements have attempted to provide the above attribute by including a separate control system conveniently located, e.g., in a homeowner's kitchen, so that the time can be reprogrammed by the user after the power interruption. Unfortunately, a separate control system is not acceptable in many applications due to cost and maintenance, and a user-reprogramming requirement is unacceptable in many applications.

Accordingly, a microcomputer-based circuit breaker energy management system is needed which overcomes the deficiencies of the prior art.

SUMMARY OF INVENTION

In accordance with a preferred embodiment of the present invention, an energy management loadpanel arrangement includes a load panel enclosure having a plurality of circuit breakers, each of which opens and closes in response to a control signal so as to interrupt an associated current path. A microcomputer generates the control signals to control the position of the circuit breakers and their associated current paths, and a volatile memory circuit, for example, RAM, stores time-event data which is used to indicate when the control signals should be generated. A charged electronic double-layered capacitor is coupled to the volatile memory so that, in the event of a power outage, operating power is provided to the volatile memory for extended periods of time. In this manner, the time-event data is retained until after the power outage so that the circuit breakers are timely controlled.

In a particular embodiment, a real time clock circuit is used to track the time, and the charged electronic double-layered capacitor is coupled to the real time clock circuit so that it also continues to operate during a power outage. Preferably, the current time is periodically stored in RAM during normal operation, so that when the microcomputer 120 recovers from a power outage, the current value of the RTC can be compared against this stored value stored in RAM. If there is a difference between these two values, the microcomputer will adjust any duration timers in RAM by this difference and correct the error caused by the power interruption.

BRIEF DESCRIPTION OF THE DRAWINGS

Other advantages of the invention will become apparent upon reading the following detailed description and upon reference to the accompanying drawings, in which:

FIG. 1b is another perspective view of the load center arrangement of FIG. 1a;

THE BEST MODE FOR CARRYING OUT THE INVENTION

The present invention has direct application for managing energy by monitoring and interrupting current paths passing through a panelboard (or circuit breaker box), according to specifications that are programmed by the user. For example, it may be desirous to program the panelboard so that certain circuit breakers open and close at specified times of the day. In this way, the energy provided through the panelboard can be efficiently used.

Figure 1A:
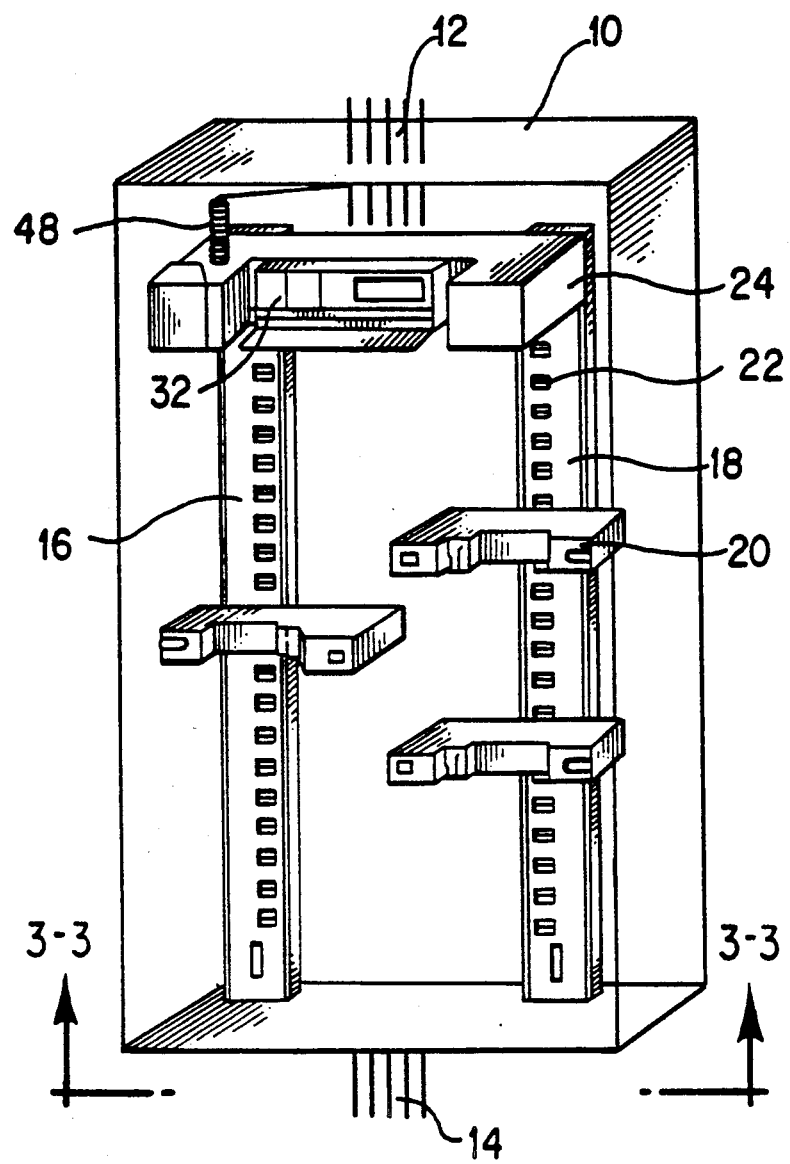
FIG. 1a is a perspective view of a load center arrangement, according to the present invention.
Figure 1B:
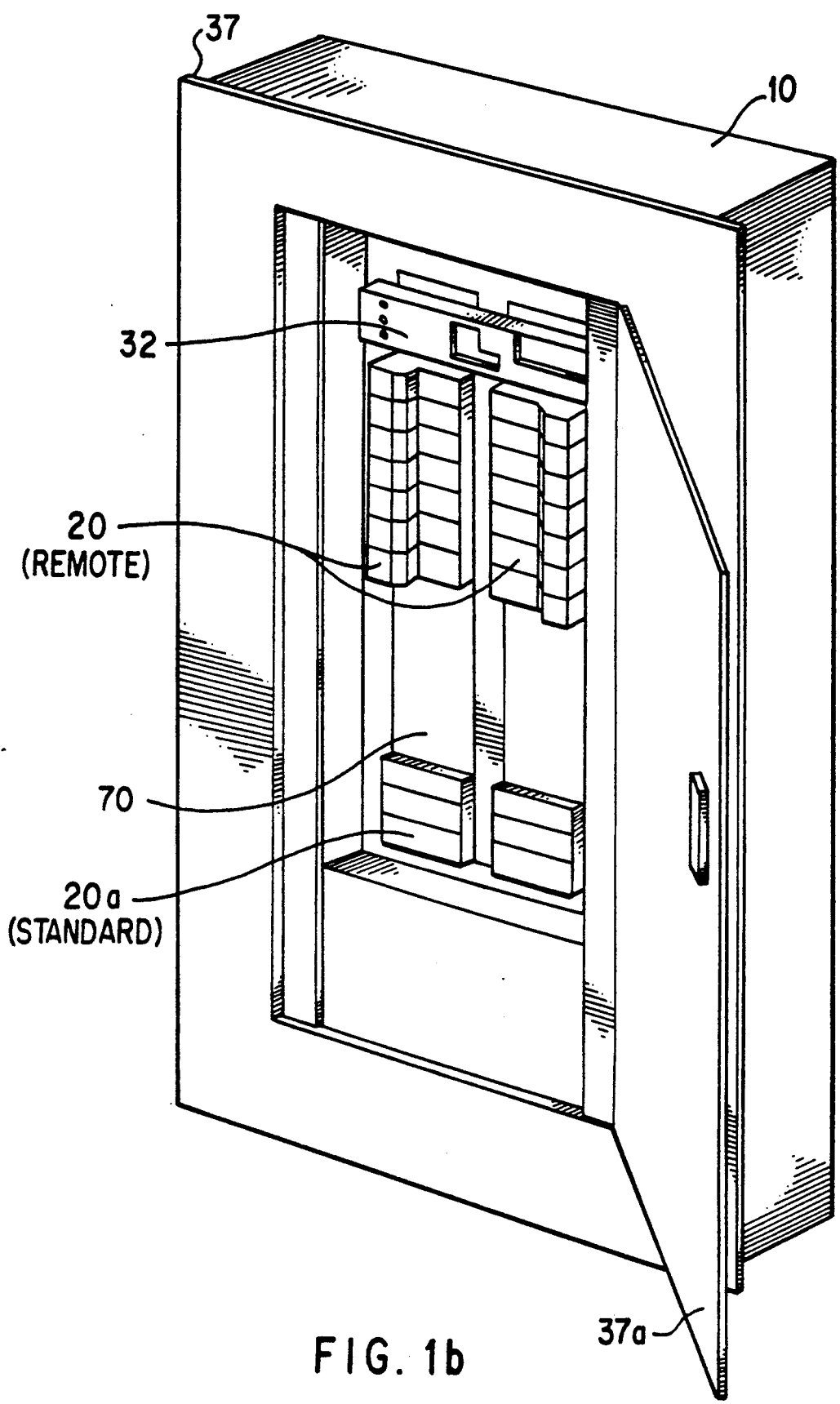

The arrangement of FIGS. 1a and 1b is illustrative. This arrangement includes a panelboard or load-center enclosure 10 which receives a plurality of input power lines 12 (FIG. 1a) from a power source (not shown). Lines 14 exit the enclosure 10 to distribute power to various loads (not shown). Bus boards 16 and 18, which may be implemented on the same board or separate boards, are disposed in parallel on each side of the loadcenter for mounting remotely-controlled circuit breakers 20, each having a plug-in socket which is coupled to one of a plurality of connectors 22 (FIG. 1a) on the bus boards 16 and 18. The connectors 22 are used with the bus boards 16 and 18 to carry motor control and contact-status signals, via an interface module 24 (FIG. 1a), to and from the circuit breakers 20. The interface module (not shown) interprets messages from a controller (or control module) 32 so as to facilitate electrical control and monitoring functions from both local and remote locations.

As illustrated in the block diagram of FIG. 2, the circuit breakers 20 are controlled by a microcomputer 102, which is part of the interface module depicted below the dashed lines. The circuit breaker 20 can be implemented using, for example, the device described in copending patent application Ser. No. 07/722,050 entitled "REMOTE CONTROLLED CIRCUIT BREAKER," which was filed on Jun. 28, 1991, now U.S. Pat. No. 5,180,051, and incorporated herein by reference.

Between the circuit breakers 20 and the microcomputer 102 there resides an interface circuit 104 which preferably includes an optical isolation circuit (not shown) to isolate the circuit breakers 20 from the remainder of the interface module. A detailed schematic of an adequate interface circuit is described and illustrated in "ELECTRICAL DISTRIBUTION SYSTEM HAVING MAPPABLE CONTROL INPUTS", supra. However, for the purpose of controlling the circuit breaker 20, a much less complex interface can be used. For example, the I/O bits from the microcomputer 102 can be used so as to directly drive the inputs of the optical isolators via motor driver circuits.

The microcomputer 102 commands the circuit breakers to their respective "opened" and "closed" positions according to respective 3-wire switch inputs provided at a dry contact interface 106. The dry contact interface 106 can be implemented using the corresponding circuit disclosed in the last-referenced application, or any equivalent circuit capable of converting the switch inputs to digital signals for retrieval by the microcomputer 102.

The circuit breakers 20 can also be controlled via a program stored by the microcomputer 120. The microcomputer 102 uses conventional memory circuits, for example ROM 108 and EEROM 110, for storage of its object code and other important data.

As an option, the interface module can also include a serial interface circuit 112 to permit the microcomputer 102 to communicate with similarly situated panelboard arrangements, such as the one shown in FIGS. 1a and 1b.

The control module (32 of FIG. 1b and shown above the dashed lines in FIG. 2) incorporates a microcomputer 120, and conventional memory circuits including ROM 122, EEPROM 124 and RAM 126, to provide the overall control for the panelboard arrangement. This control includes overall initialization, communication between the microcomputers 120 and 102, monitoring and control of the keyboard and display 130, and I/O communication via a serial interface 132 or a network interface 134. A multiplexer 136 is used to establish which interface 132 or 134 communicates with the microcomputer 120. The ability to control the circuit breakers 20 according to the time of the day is established by a program entered via the keyboard and display 130. The microcomputer 120 employs a conventional real time clock (RTC) 138, such as the DS1283S available from Dallas Semiconductor, to maintain the time.

Figure 2:
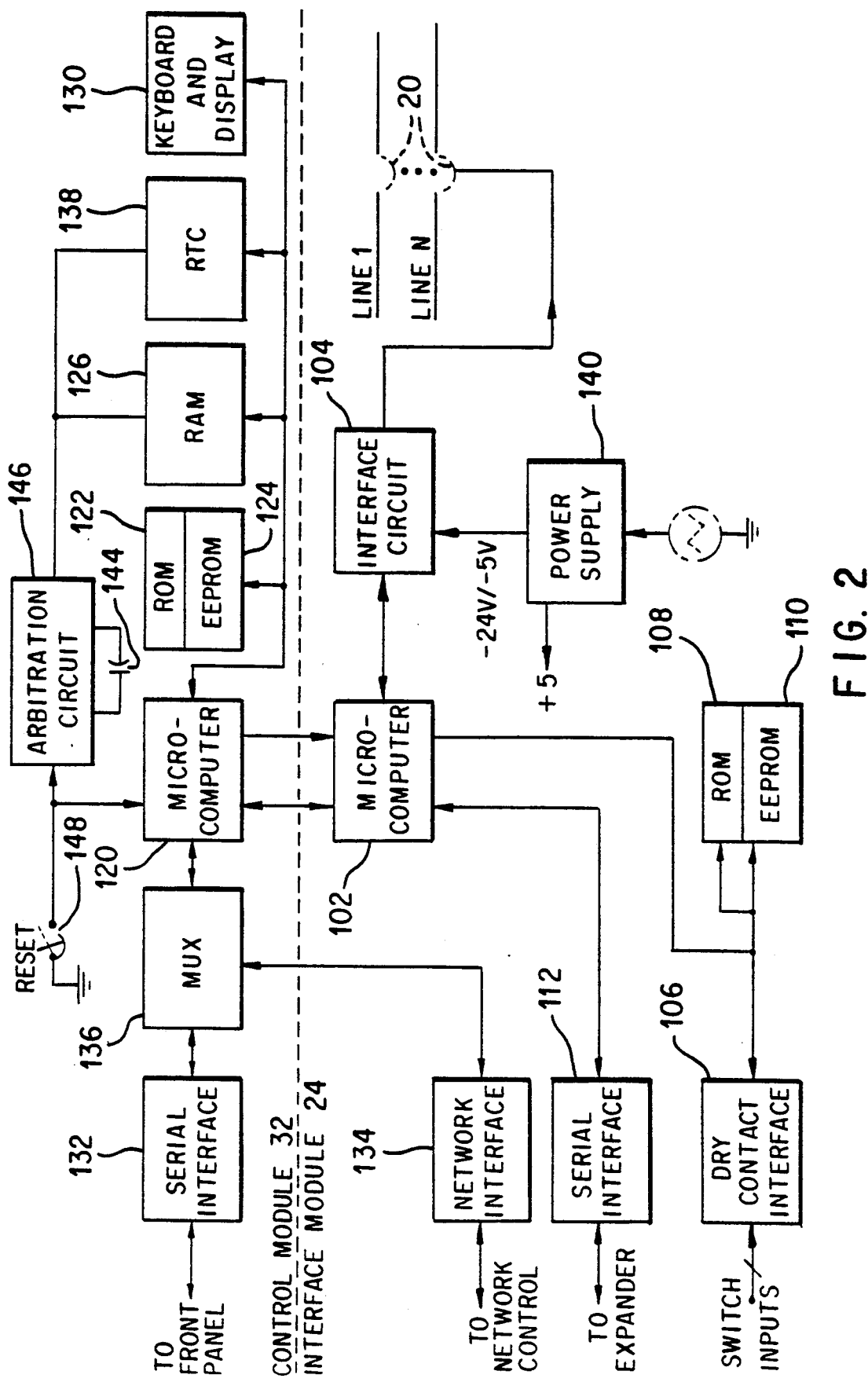
FIG. 2 is a block diagram of the control module and interface shown in FIGS. 1a and 1b.

The entire panelboard arrangement of FIG. 2 is provided power via a power supply 140, which is conventionally sourced by a 240 volt AC or 480 volt AC line and, therefore, is susceptible to long-term power interruptions. These long-term power interruptions, for example, are frequently encountered with electric company overloads, blackouts and other events requiring manual service or repair by the electric company. Thus, during these interruptions a secondary power supply is needed to maintain the integrity of important data which is used frequently and is not stored in the non-volatile EEPROM.

According to the present invention, the secondary power supply is provided using an electrical double-layer capacitor (EDLC or SUPERCAP) 144, which supplies secondary power to the RTC 138 and RAM 126 via a power arbitration circuit 146. The arbitration circuit 146 ensures that a +5 Volt source supplies power to the RTC 138 and RAM 126 either from the power supply 140 or from a stored capacitive charge on the EDLC 144. Thus, in the event that the power supply 140 shuts down, each of the circuits shown in FIG. 2 powers down except for the RTC 138 and RAM 126 (and unshown logic support circuits), which stay powered up as long as there is sufficient charge on the EDLC 144. An FS or FE type SUPERCAP available from NEC Corporation, which may be used for this application provides several weeks of standby power for the implementation shown in the figures.

A reset switch 148 is used to reset the entire circuit of FIG. 2 via its connection to both the microcomputer 120 and the arbitration circuit 146.

Figure 3:
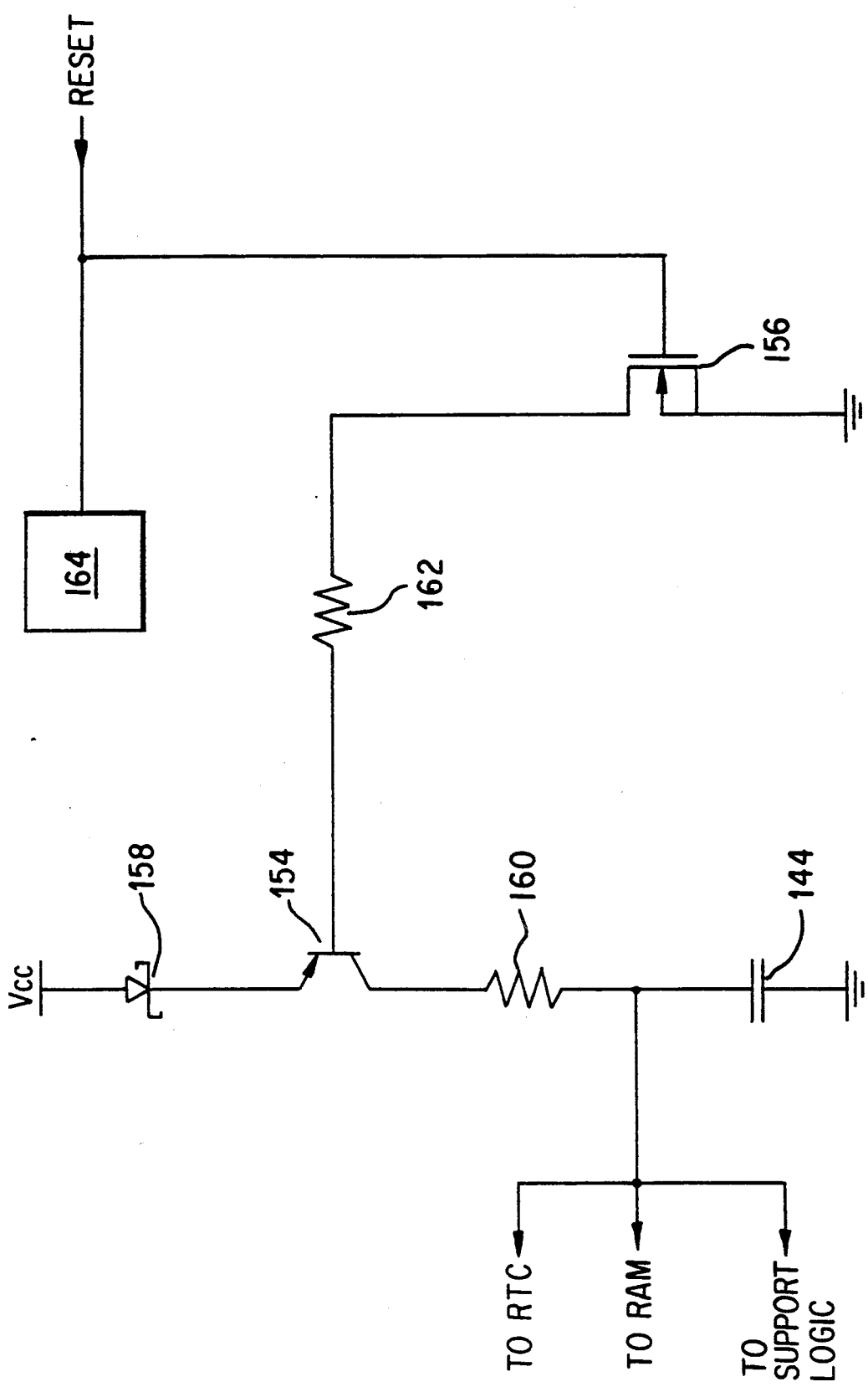
FIG. 3 is a circuit diagram of an arbitration circuit as set forth generally in the block diagram of FIG. 2; and While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the intention is to cover all modifications, equivalents, and alternatives falling within the spirit and scope of the invention as defined by the appended claims.

The arbitration circuit 146, which is shown in expanded form in FIG. 3, includes a bipolar transistor 154 and a FET 156, a Schottky diode 158, 270 Ohm and 1000 Ohm bias resistors 160 and 162, respectively, and a reset circuit 164. The transistor 154 responds to a reset signal so that the FET 156 is activated whenever reset is active high. The Schottky diode 158 is the primary arbitrating component insofar as it passes current from the +5 Volt power supply (Vcc) in only one direction to provide power to the RTC and RAM and charge the EDLC 144 until power fails; at which time the EDLC 144 begins to discharge slowly, thereby providing power to the RTC and RAM.

The microcomputer 120 of FIG. 2 executes a program, stored in ROM 122, to ensure that any software timer (stored in RAM 126 as a variable) being used to time an event is stopped when the power supply has failed to maintain the microcomputer 120 in a powered up mode. Otherwise, all time-based control systems will exhibit an error when an output is controlled for a duration of time which overlaps the time during which the power supply has failed. For example if a one-hour override timer is started immediately before the power outage and the outage lasts for one hour, the output intended to be controlled by the override timer will remain on for one hour after power is restored instead of turning off after the proper elapsed time. This is because software timers that are used to time an event are stopped during this outage, although the RTC 138 may continue to keep the correct time.

This problem is resolved by periodically storing the current time in RAM 126 during normal operation. Preferably, this image of the RTC time is saved in RAM 126 at least once per minute. During a power outage, the microcomputer 120 will stop running, and this image in the RAM will not be updated. After power up, the current value of the RTC is compared against the value stored in RAM. If there is a difference between these two values, the microcomputer will adjust any duration timers in RAM by this difference and correct the error caused by the power interruption.

Other aspects of the arrangement shown in FIG. 2 are illustrated and described in co-pending U.S. patent application Ser. No. 901,453, filed concurrently herewith and entitled "COMPUTER-CONTROLLED CIRCUIT BREAKER ARRANGEMENT WITH CIRCUIT BREAKER HAVING IDENTIFICATION CIRCUIT," assigned to the instant assignee.

While the invention has been particularly shown and described with reference to a few particular embodiments, it will be recognized by those skilled in the art that modifications and changes may be made to the present invention described above. For example, the block diagram shown in FIG. 2 is representative of only one implementation, and numerous modifications can be made thereto, as well as to the individual circuits, without departing from the spirit and scope of the invention which is set forth in the claims that follow.

What is claimed is:

1. An energy management load panel arrangement, comprising:
    a load panel enclosure;
    a plurality of circuit breakers secured in the enclosure, each of said circuit breakers capable of opening and closing in response to a control signal so as to interrupt an associated current path;
    at least one microcomputer for generating said control signals to control said circuit breakers and their associated current paths;
    a real-time-clock circuit, coupled with said at least one microcomputer, for automatically providing the time of day;
    a volatile memory circuit for storing time-event data which is used to indicate when at least one of said control signals should be generated; and
    an electronic multi-layered capacitor coupled to said volatile memory for providing operating power thereto for a significant period of time during a power outage;
    wherein the time-event data is retained during the power outage so that the circuit breakers are timely controlled, after the power outage, in response to said control signals, and the microcomputer automatically reads the time of day in the real time clock and, based thereon, corrects the time-event data in the volatile memory.

2. An energy management, load panel arrangement, according to claim 1, wherein said volatile memory circuit and said microcomputer are packaged in separate integrated circuits.

3. An energy management, load panel arrangement, according to claim 1, wherein said electronic multilayered capacitor is coupled to provide power to said real-time clock.

4. An energy management, load panel arrangement, according to claim 3, wherein said electronic multilayered capacitor is arranged so that it does not provide power to said at least one microcomputer.

5. An energy management, load panel arrangement, according to claim 1, wherein said electronic multilayered capacitor is arranged so that it does not provide power to said at least one microcomputer.

6. An energy management, load panel arrangement, according to claim 1, wherein said time-event data is used by said at least one microcomputer to determine when to generate at least one of said control signals.

7. An energy management, load panel arrangement, according to claim 1, further including current blocking means, coupled to said electronic multilayered capacitor, for blocking current therefrom to said microcomputer.

8. An energy management, load panel arrangement, according to claim 1, wherein said electronic multilayered capacitor is a double layered capacitor.

9. An energy management, load panel arrangement, according to claim 1, wherein said microcomputer is programmed to compare, after recovering from the power outage, the time of day provided by the real time clock and the time event data in volatile memory.

10. An energy management, load panel arrangement, according to claim 1, wherein said time-event data includes a duration timer.

11. An energy management load panel arrangement, comprising:
    a load panel enclosure;
    a plurality of circuit breakers secured in the enclosure, each of said circuit breakers capable of opening and closing in response to a control signal so as to interrupt an associated current path;
    at least one microcomputer also in said load panel enclosure for generating said control signals to control said circuit breakers and their associated current paths;
    a real time clock circuit, coupled to the microcomputer for providing the time of day automatically;
    a volatile memory circuit for storing time-event data which is used to indicate when at least one of said control signals should be generated; and
    an electronic double-layered capacitor coupled to the real time clock and to said volatile memory for providing operating power thereto for a significant period of time during a power outage;
    wherein the time-event data is retained during the power outage so that the circuit breakers are timely controlled, after the power outage, in response to said control signals, and the microcomputer reads the time of day in the real time clock and, based thereon, corrects the time-event data in the volatile memory.

12. An energy management, load panel arrangement, according to claim 11, wherein the microcomputer is programmed to read the time of day in the real time clock and to store an image thereof in the volatile RAM periodically.

13. An energy management, load panel arrangement, according to claim 12, wherein the periodic storage of said image occurs about once per minute.

14. An energy management, load panel arrangement, according to claim 11, wherein the time-event data includes a duration timer.

15. An energy management, load panel arrangement, according to claim 14, wherein after the power outage, the microcomputer corrects the duration timer according to the time of day in the real time clock.

16. An energy management, load panel arrangement, according to claim 13, wherein the time-event data includes a duration timer and after the power outage the microcomputer corrects the duration timer according to the time of day in the real time clock.

17. An energy management, load panel arrangement, according to claim 11, further including current arbitration means for maintaining the charge on the capacitor until the power outage occurs.

18. An energy management, load panel arrangement, according to claim 17, including a switch for resetting said current arbitration means.

19. An energy management, load panel arrangement, according to claim 17, wherein said electronic double-layered capacitor is arranged so that it does not provide power to said at least one microcomputer.

* * * * *